(12) United States Patent
Fincher

(10) Patent No.: US 10,046,611 B2
(45) Date of Patent: Aug. 14, 2018

(54) MECHANICAL CONNECTING LINK FOR TOW STRAPS AND PINTLE HITCHES

(71) Applicant: Charles Kennith Fincher, Fredericksburg, VA (US)

(72) Inventor: Charles Kennith Fincher, Fredericksburg, VA (US)

( * ) Notice: Subject to any disclaimer, the term of this patent is extended or adjusted under 35 U.S.C. 154(b) by 379 days.

(21) Appl. No.: 14/867,142

(22) Filed: Sep. 28, 2015

(65) Prior Publication Data
US 2017/0087946 A1    Mar. 30, 2017

(51) Int. Cl.
*B60D 1/02*    (2006.01)
*B60P 7/06*    (2006.01)

(52) U.S. Cl.
CPC ............... *B60D 1/025* (2013.01); *B60P 7/06* (2013.01)

(58) Field of Classification Search
CPC .............. B60D 1/02; B60D 1/025; B60P 7/06
USPC ..... 280/477; 294/1.1, 82.1, 89; 403/78, 164, 403/165
See application file for complete search history.

(56) References Cited

U.S. PATENT DOCUMENTS

| | | | | |
|---|---|---|---|---|
| 3,904,154 A | * | 9/1975 | Jones | B60P 7/0807 114/261 |
| 4,074,519 A | * | 2/1978 | Garrett | B66C 1/66 248/499 |
| 5,330,300 A | * | 7/1994 | Jones | B60P 7/0823 410/101 |
| 6,749,237 B1 | * | 6/2004 | Ma | B66C 1/66 294/180 |
| 8,205,922 B1 | * | 6/2012 | Ohman, Jr. | F16G 15/06 294/82.1 |
| 8,376,434 B2 | * | 2/2013 | Gaibler | B66C 1/12 294/74 |
| 8,381,363 B2 | * | 2/2013 | Boeckman | F16G 15/06 24/132 WL |
| 9,429,182 B2 | * | 8/2016 | Maurice | F16B 45/04 |
| 2011/0175384 A1 | * | 7/2011 | Segura | B66C 1/10 294/82.1 |

* cited by examiner

*Primary Examiner* — Jacob D Knutson
(74) *Attorney, Agent, or Firm* — Laurence P. Colton; Smith Tempel Blaha LLC

(57) ABSTRACT

A mechanical connecting link for tow straps and pintle hitches configured to quickly and easily disassemble even during complex pulling scenarios. The mechanical connecting link also is configured to retain its structural integrity even during heavy loads. The mechanical connecting link has at least two modular "wide body" connector components on which looped tow straps may engage. The modular "wide body" connector component configured to keep the bend radius of any engaged tow strap large enough to prevent abrasion and to resist damage to the tow strap loop during pulling scenarios.

15 Claims, 7 Drawing Sheets

MECHANICAL CONNECTING LINK FOR TOW STRAPS AND PINTLE HITCHES

BACKGROUND OF THE INVENTION

Field of the Invention

The present invention generally relates to a mechanical connecting link for tow straps or pintle hitches. More specifically, the present invention relates to a modular quick release mechanical connecting link for tow straps or pintle hitches.

Related Art

Mechanical connecting links for tow straps, chains, heavy duty wires, pintle hitches, etcetera, require many, often competing, functions. As in many designs, in order to maximize the functionality of one operation there is often a concomitant reduction in the functionality of another operation.

For example, in order to prevent structural failure of the mechanical connecting link during heavy loads, it is preferable to rigidly secure the components making up the mechanical connecting link such that they do not disengage. This is, for example, accomplished via a "press fit" or a threaded screw. However, in order to more effectively and efficiently handle multiple tow straps engaging the mechanical connecting link during complex pulling scenarios, it is preferable to have a mechanical connecting link with quick release components.

Additionally, in order to complement the various tow straps, and the various positions/angles they assume during heavy loads, it is preferable to have differently structured connector components making up the mechanical connecting link. For example, in a common dual shackle embodiment, the first "horseshoe" component, which receives the primary pulling force from a single or first pulling tow strap or from multiple first towing straps or from a pintle hitch, may be constructed to handle the force, and to prevent abrasion/resistance damage to the tow strap loop. The second "horseshoe" component, which engages with a secondary or multiple secondary tow straps, may be constructed to hold the secondary tow straps at certain specific positions and/or angles, and to handle their tension. It is also preferable to construct the "horseshoe" components identically in order to more effectively and efficiently machine the components of the mechanical connecting link. This also makes it easier for a user to assemble the mechanical connecting link whenever it is disassembled and jumbled with various other components.

There is, therefore, a need in the art for a mechanical connecting link that can balance these competing functions. Accordingly, there is now provided with this disclosure an improved mechanical connecting link for tow straps and pintle hitches effectively overcoming the aforementioned difficulties and longstanding problems inherent in the art. These problems have been solved in a simple, convenient, and highly effective way by which to construct a mechanical connecting link for tow straps.

BRIEF SUMMARY OF THE INVENTION

Briefly, the present invention is a mechanical connecting link for tow straps and pintle hitches. In certain embodiments, the present invention relates to a modular "wide body", "shackle style", and quick release mechanical connecting link for tow straps and pintle hitches. In certain embodiments, the present invention relates to a modular "shackle style" and quick release mechanical connecting link for tow straps with entanglement avoidance features.

In one illustrative embodiment, a mechanical connecting link comprises a pair of modular connector components and a quick release pin. The pair of modular connector components each, respectively, comprises a bent portion between a first end and a second end. The contour of the bent portion defines an inner side and an outer side that extend from the first end to the second end. The outer side is flared when compared to the margins of the inner side. The quick release pin detachably and pivotally couples the pair of modular connector components such that each modular connector component forms an articulating shackle about the quick release pin. Each articulating shackle is configured to engage with one or more looped tow straps along the bent portion. In another embodiment, one of the articulating shackles is configured to engage with a pintle, for example, to extend the reach of the pintle or to allow the attachment of a tow strap or the like to the pintle. The mechanical connecting link is configured to optionally disassemble via removal of the quick release pin even when one or more looped tow straps are engaged and taut.

The outer side of the bent portion of the mechanical connecting link can comprise a first superficial ridge and a second superficial ridge. The first and second superficial ridges are situated on the junction of the inner side and the outer side of the bent portion. The first and second superficial ridges run lengthwise along the junction and define a valley there between. The valley of each modular connector component can be bisected by a midpoint. On either side of the midpoint, the valley tapers toward the midpoint such that the midpoint is elevated to the same height as the first and second superficial ridges. The use of such valleys can have a positive effect on the strength and/or rigidity of the connector components.

The first end of each of the modular connector components can be a clevis termination, and the second end can be a male clevis prong. The clevis termination defines a space between an outer clevis prong and an inner clevis prong. The space is configured to receive the male clevis prong to facilitate the coupling of the first modular connector component with the second modular connector component.

The outer clevis prong of the clevis termination of the modular connector components can define a first aperture, the inner clevis prong of the clevis termination can define a second aperture, and the male clevis prong can define a third aperture. The quick release pin traverses the first aperture, the second aperture, and the third aperture of each modular connector component to facilitate the pivoting and coupling of the first modular connector component with the second modular connector component.

The junctions between the bent portion, the first end, and the second end of the modular connector components each can be, respectively, smooth and rounded, and the junctions between the inner side and the outer side each can be, respectively, smooth and rounded. The contour of the outer clevis prong and the inner clevis prong of each clevis termination of each modular connector component also can be smooth and rounded to prevent entanglement of any looped tow straps.

The junctions between the bent portion, the first end, and the second end of the modular connector components each can be, respectively, smooth and rounded, and the junctions between the inner side and the outer side each can be, respectively, configured to minimize surface friction against a looped tow strap or pintle hitch rubbing thereon. For example, the junction between the inner side and the outer side each can comprise, respectively, a dimpled surface.

The mechanical connecting link additionally can comprise a snap ring and a retention cable. The snap ring is configured to prevent the quick release pin from retracting out of the mechanical connecting link during engagement with looped and taut tow straps, with a pintle hitch, or with any combination thereof. The retention cable is configured to detachably retain, and prevent loss of, the snap ring when it is disengaged from the quick release pin.

The quick release pin can traverse the outer clevis prong, the inner clevis prong, and the male clevis prong of each modular connector component. The first modular connector component, therefore, can form a first articulating shackle about the quick release pin, and the second modular connector component can form a second articulating shackle about the quick release pin. The inner clevis prong of the first articulating shackle is adjacent to the inner clevis prong of the second articulating shackle.

The first modular connector component and the second modular connector component envelope the quick release pin when forming the first articulating shackle and the second articulating shackle with adjacent inner clevis prongs.

These features, and other features and advantages of the present invention, will become more apparent to those of ordinary skill in the relevant art when the following detailed description of the preferred embodiments is read in conjunction with the appended drawings in which like reference numerals represent like components throughout the several views.

BRIEF DESCRIPTION OF THE DRAWINGS

Specific embodiments of the present invention will be described with reference to the following drawings, wherein.

DETAILED DESCRIPTION OF PREFERRED EMBODIMENTS

Embodiments and aspects of the present invention provide a modular mechanical connecting link for tow straps and pintle hitches. Unlike prior art mechanical connecting links, the mechanical connecting link of the present disclosure is configured to quickly and easily assemble and disassemble. This is true even during complex pulling scenarios such as, for example, when multiple tow straps are engaging with opposite connector components of the mechanical connecting link, or when multiple tow straps are engaging with the same connector component of the mechanical connecting link. Nonetheless, the mechanical connecting link is also configured to retain its structural integrity even under heavy loads. In certain embodiments, these functions are facilitated by a quick release pin that detachably and pivotally couples a pair of modular connector components to form a mechanical connecting link.

Additionally, the mechanical connecting link of the present invention may comprise at least two modular "wide body" connector components on which one or more looped tow strap(s) may engage. The modular connector component is structured and shaped to detachably and pivotally couple with at least one other similar modular connector component. The modular connector component is also structured and shaped to handle the force from one or more looped tow straps, and to keep the bend radius of any engaged taut tow strap(s) large enough to prevent abrasion or resistance damage to the tow strap loop. In certain embodiments, these functions are facilitated by the specialty shaped flared out (i.e., "wide body") modular horseshoe component configured to engage with one or more looped tow strap(s) at various positions and angles.

Additionally, the mechanical connecting link of the present invention may comprise at least two modular connector components on which a pintle hitch may engage. The modular connector components are structured and shaped to complement, and fit within, the space defined by the pintle hook. The mechanical connecting link is, therefore, structured and shaped to rotate about a closed pintle hitch at one modular connector component, and the other modular connector component is structure and shaped to handle the force from one or more looped tow straps.

Figure 1:
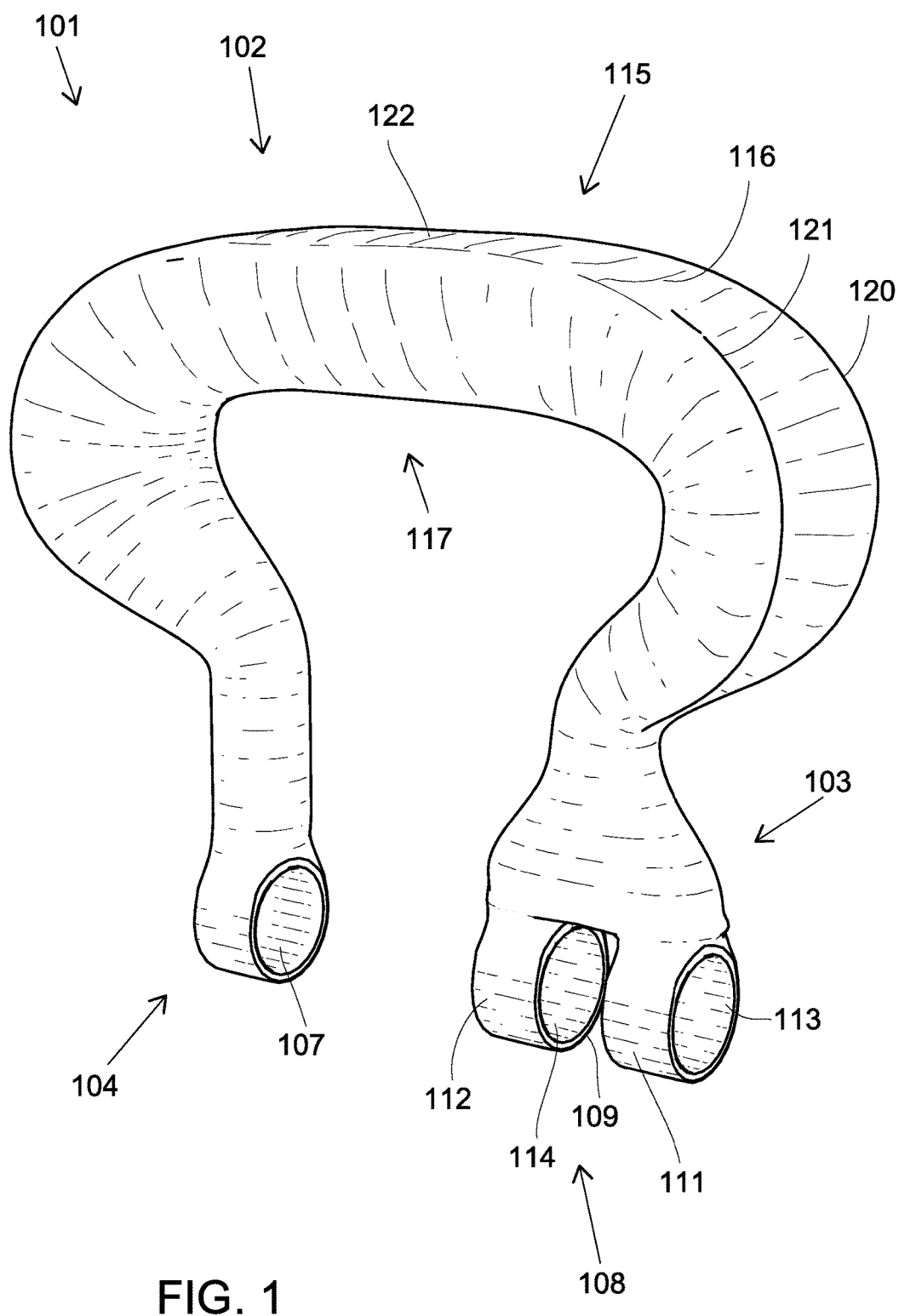
FIG. 1 is a perspective view of a first modular connector component of a mechanical connecting link.
Figure 2:
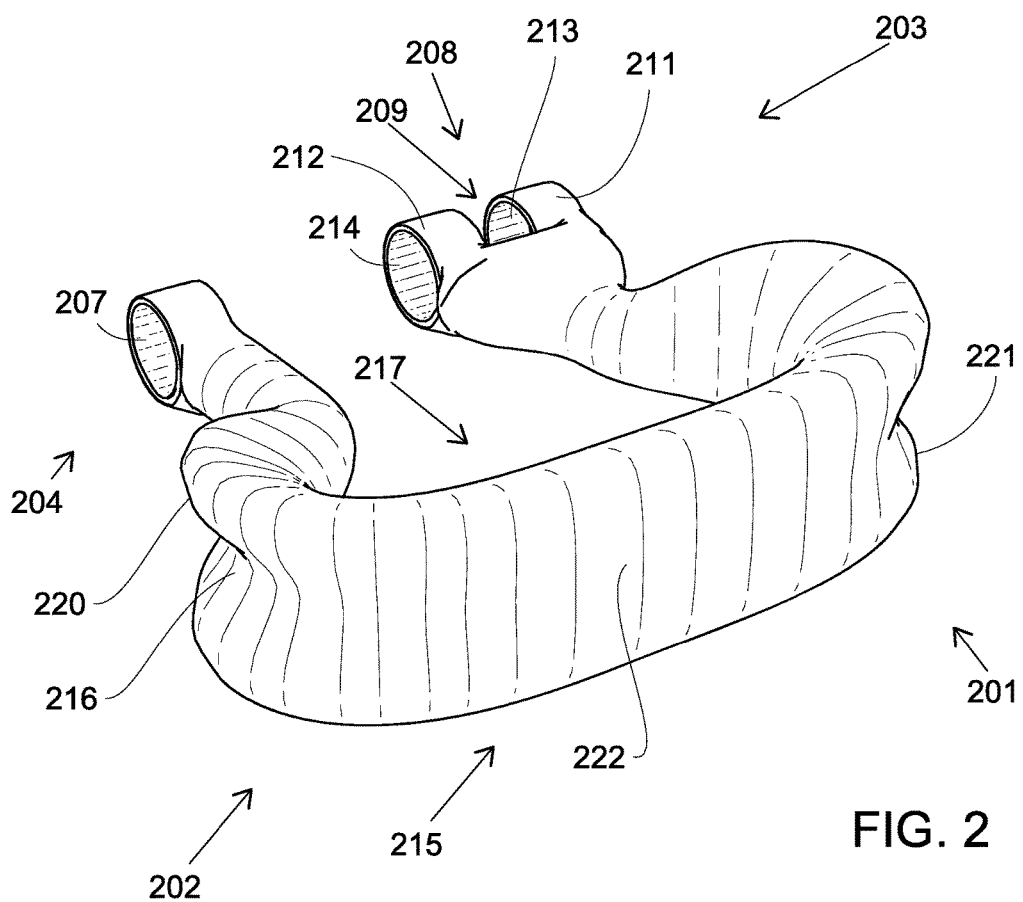
FIG. 2 is a perspective view of a second modular connector component.

Referring now to the drawings, wherein the showings are for purposes only of illustrating the various embodiments of the present disclosure, and not for purposes of limiting the same, FIG. 1 is a first perspective view of an embodiment of a first modular connector component of a mechanical connecting link. FIG. 2 is a second perspective view of an embodiment of a second modular connector component. The connector components are separated from any other connector components, and any other components upon which it may be integrated or combined.

It is envisioned that the modular connector component 101, 201 may be one contiguous discrete piece that is forged or molded. It is also envisioned that the connector component 101, 201 may be a composite of multiple discrete and/or non-discrete component pieces that are permanently and/or detachably engaged with one another. A person having ordinary skill in the art recognizes that the connector component 101, 201 may be made of any material(s); however, a preferred embodiment of the component is comprised and structured to provide a minimum break strength of up to or greater than 100,000 pounds. In other embodiments, the minimum break strength is 150,000 pounds, 160,000 pounds, or 175,000 pounds, etcetera. A person having ordinary skill in the art of manufacturing understands the intricacies and fine details of building and structuring a connector component for this type of heavy load. More specifically, the break strength of the invention is limited only by the materials of manufacture.

It is also envisioned that the modular connector component 101, 201 may be in and of itself, or superficially lined by, a corrosive resistant material(s) and/or a friction reducing material(s). This is especially true for any region of the connector component 101, 201 that may be in contact with the external environment and/or any other articulable part of the mechanical connecting link. It is also envisioned that the dimensions of the connector component 101, 201 are not limited by what is depicted in FIGS. 1 and 2. A person having ordinary skill in the art understands that the connector component 101, 201 may be scaled in size for any application or use.

The modular connector component 101, 201 shown in FIGS. 1-2 comprises a bent portion 102, 202 between a first end 103, 203 and a second end 104, 204. The first end 103, 203 has a clevis termination 108, 208. The clevis termination 108, 208 defines a space 109, 209 between an outer clevis prong 111, 211 and an inner clevis prong 112, 212. The outer clevis prong 111, 211 defines a first aperture 113, 213. The inner clevis prong 112, 212 defines a second aperture 114, 214. The space 109, 209 is configured to receive the second end 204, 104 of the connector component 201, 101 such that the second end 204, 104 may pivot/rotate within the space 109, 209. Therefore, the clevis termination 108, 208 is the female end of the connector component 101, 201. See, for example, FIGS. 4-7.

Conversely, the second end 104, 204 is the male end of the modular connector component 101, 201 and, therefore, is configured to fit within the space 209, 109 of the connector component 201, 101 such that the second end 204, 104 may pivot and/or rotate within the space 109, 209. Furthermore, because the second end 104, 204 defines a third aperture 107, 207, the second end 104, 204 is also configured to fit within the space 209,109 such that the first aperture 113, 213, the second aperture 114, 214, and the third aperture 107, 207 align throughout any pivoting and/or rotating of the second end 104, 204 within the space 109, 209.

The contour of the bent portion 102, 202 of the modular connector component 101, 201 shown in FIGS. 1-2 defines an inner side 117, 217 and an outer side 115, 215 that extend from the first end 103, 203 to the second end 104, 204. In this particular embodiment, the connector component 101, 201 is shaped and structured in certain portions like the horseshoe component of a common shackle connector. In other portions, for improved performance, the connector component 101 is shaped and structured differently than the horseshoe component 101, 201.

More specifically, the inner side 117, 217 of the bent portion 102, 202 is smooth and rounded like the inner side of the horseshoe component of a common shackle connector. In other embodiments, the inner side 117, 217 may take various shapes and structures known to one of ordinary skill in the art. Unlike the horseshoe component, the outer side 115, 215 of the bent portion 102, 202 comprises a superficial first ridge 120, 220 and a superficial second ridge 121, 221 running lengthwise and defining a valley 116, 216 there between.

The first ridge 120, 220 and the second ridge 121, 221 of the bent portion 102, 202 preferably are seamless, smooth, and rounded. The first ridge 120, 220 and the second ridge 121, 221 are situated along the contour of the bent portion 102, 202 such that the outer side 115, 215 is flared when compared to the margins of the inner side 117, 217. The margins of the outer side 115, 215 seamlessly intersect with the margins of the inner side 117, 217 such that the junction preferably is smooth. Similarly, the junctions between the bent portion 102, 202, the first end 103, 203, and the second end 104, 204 of the connector component 101, 201 preferably are each, respectively, smooth, and rounded.

Figure 3:
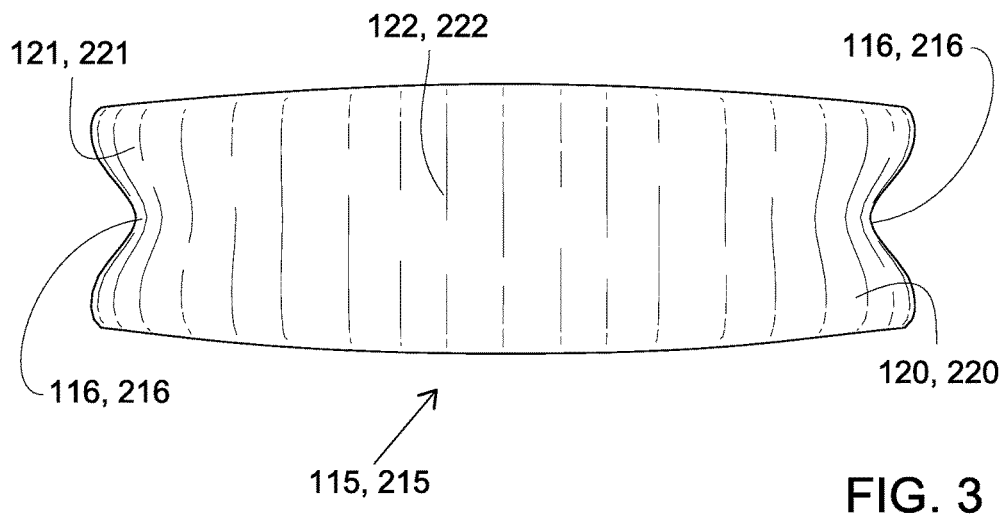
FIG. 3 is a top plan view of the outer side of the bent portion of the modular connector components of FIGS. 1-2.

In one embodiment, as depicted in FIG. 3, the valley 116, 216 of the outer side 115, 215 is bisected by a midpoint 122, 222. The valley 116, 216 on either side of the midpoint 122, 222 tapers towards the midpoint 122, 222 such that the midpoint 122, 222 is elevated to the same height as the first ridge 120, 220 and the second ridge 121, 221. As the junction of the outer side 115, 215 seamlessly intersect with the margins of the inner side 117, 217, the junction complements and maintains the rounding of the inner side 115, 215. As the midpoint 122, 222 of the outer side 115, 215 is not recessed into the valley 116, 216, the midpoint 122, 222 also complements and maintains the rounding of the inner side 115, 215. The use of such valleys 116, 216 can have a positive effect on the strength and/or rigidity of the connector components 101, 201, as is known in the art.

In this particular embodiment, the junctions complement and gradually transition from the contours of the inner side 117, 217 and the outer side 115, 215. In other embodiments, the junctions may involve more complex geometries and configurations to minimize surface abrasion and friction against a surface rubbing thereon, for example, a dimpled surface or a surface dotted with ball bearings. This is especially beneficial as sometimes, during complex pulling scenarios involving multiple tow straps engaged to the same connector component 101, 201, the individual tow straps may assume a position and/or angle that rubs against the junctions. In the same manner, less complex geometries and configurations can be advantageous based on the proposed use of the device and the type of tow straps to be attached to the device.

Figure 4:
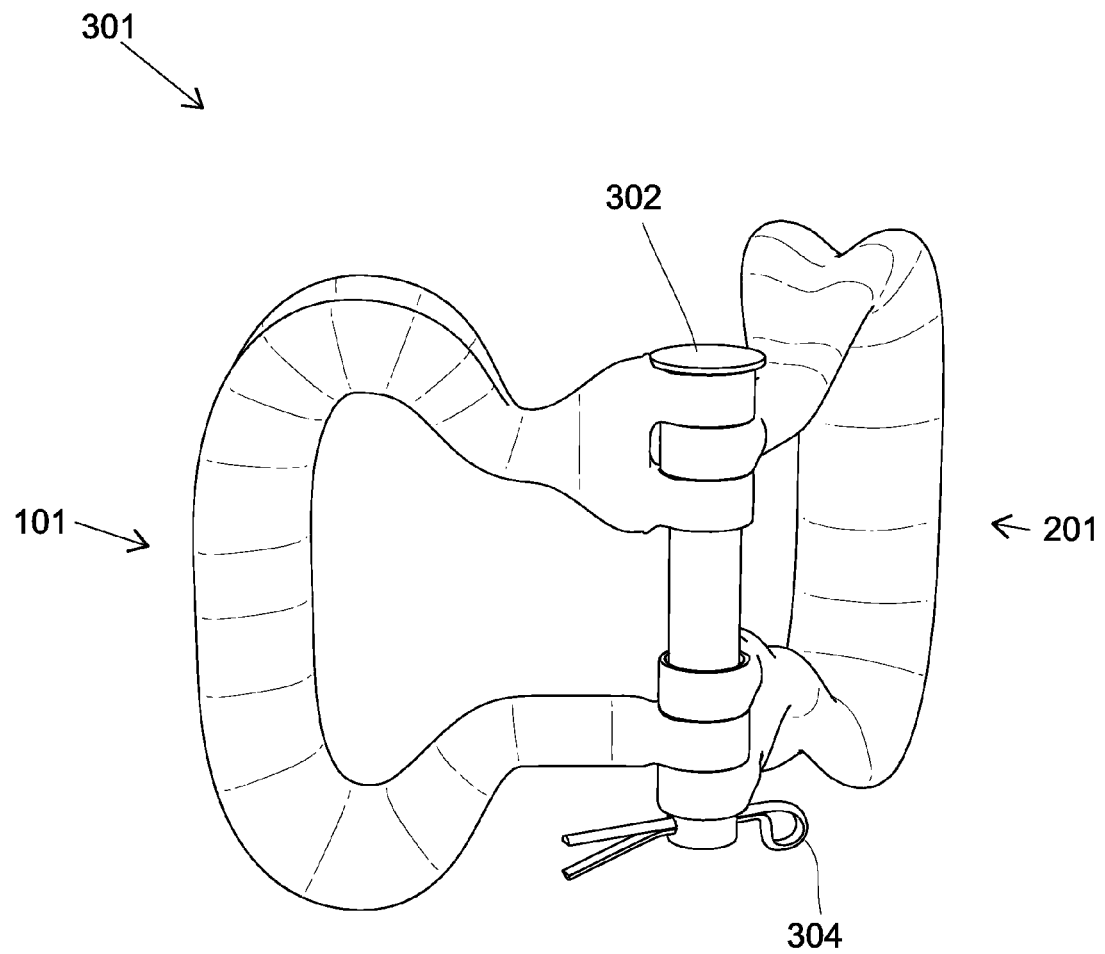
FIG. 4 is a perspective view of a modular mechanical connecting link made up of the modular connector components of FIGS. 1-2.

FIG. 4 is a perspective view of one embodiment of a modular mechanical connecting link made up of the modular connector components of FIGS. 1-2. The connector components 101 and 201 are detachably coupled to one another via a quick release pin 302 (best seen in FIG. 5) and a snap ring/clevis tang 304. The mechanical connecting link 301 is fully assembled with the connector components 101 and 201 articulated about the pin 302 to define a 90-degree angle there between. The connector components 101, 201 can be articulate throughout approximately 360-degrees relative to each other, depending on the thickness of the connector components 101, 201. No tow straps are engaged to the connector components 101 and 201.

More specifically, the clevis termination 108 of the first end 103 of the modular connector component 101 is engaged with the second end 204 of the modular connector component 201. Similarly, the clevis termination 208 of the first end 203 of the connector component 201 is engaged with the second end 104 of the connector component 101. The first aperture 113, 213 and the second aperture 114, 214 of the first end 103, 203 are aligned with the third aperture 107, 207 of the second end 104, 204. Similarly, the first aperture 113, 213 and the second aperture 114, 214 of the first end 103, 203 are aligned with the third aperture 207, 107 of the second end 104, 204.

Therefore, as all of the apertures are aligned, the quick release pin 302 traverses through the apertures, and detachably and pivotally couples the connector components 101 and 201 together with retention from the snap ring/clevis tang 304. Furthermore, as the inner sides 117 and 217 of the bent portions 102 and 202 of the modular connector components 101 and 201 are shaped and structured like the horseshoe component of a common shackle connector, the mechanical connecting link 301 forms a dual shackle connector united by a common quick release pin 302. Other embodiments may involve three or more modular connector components, and more complex configurations for the pin 302 and/or the snap ring/clevis tang 304.

In the fully assembled configuration, the mechanical connecting link 301 is configured to receive and retain one or more looped tow strap, pulling at their maximum straight line capacity (best seen in FIG. 5), along any portion of the modular connector components 101 and 201. Depending on the pull angle and position of the tow straps along the connector components 101 and 201, the shackles on either side of the quick release pin 302 are configured to articulate until they reach an equilibrium position. The structural integrity of the modular mechanical connecting link 301 is sufficient to have a minimum break strength upwards of 175,000 pounds, and the strength (including the desired strength if greater than or less than 175,000 pounds) is dependent only on the material of manufacture and dimensions of the mechanical connecting link 301.

Furthermore, because the mechanical connecting link 301 comprises the modular connector components 101 and 201, the shackles on either side of the quick release pin 302 also are configured to keep the bend radius of any looped and taut tow strap large enough to prevent abrasion and resistance damage to the tow strap loop. This is beneficial, as is understood by one having ordinary skill in the art, as once a tow strap is folded or looped, in any way, it lessens in strength by the cosine of the pull angle.

Figure 5:
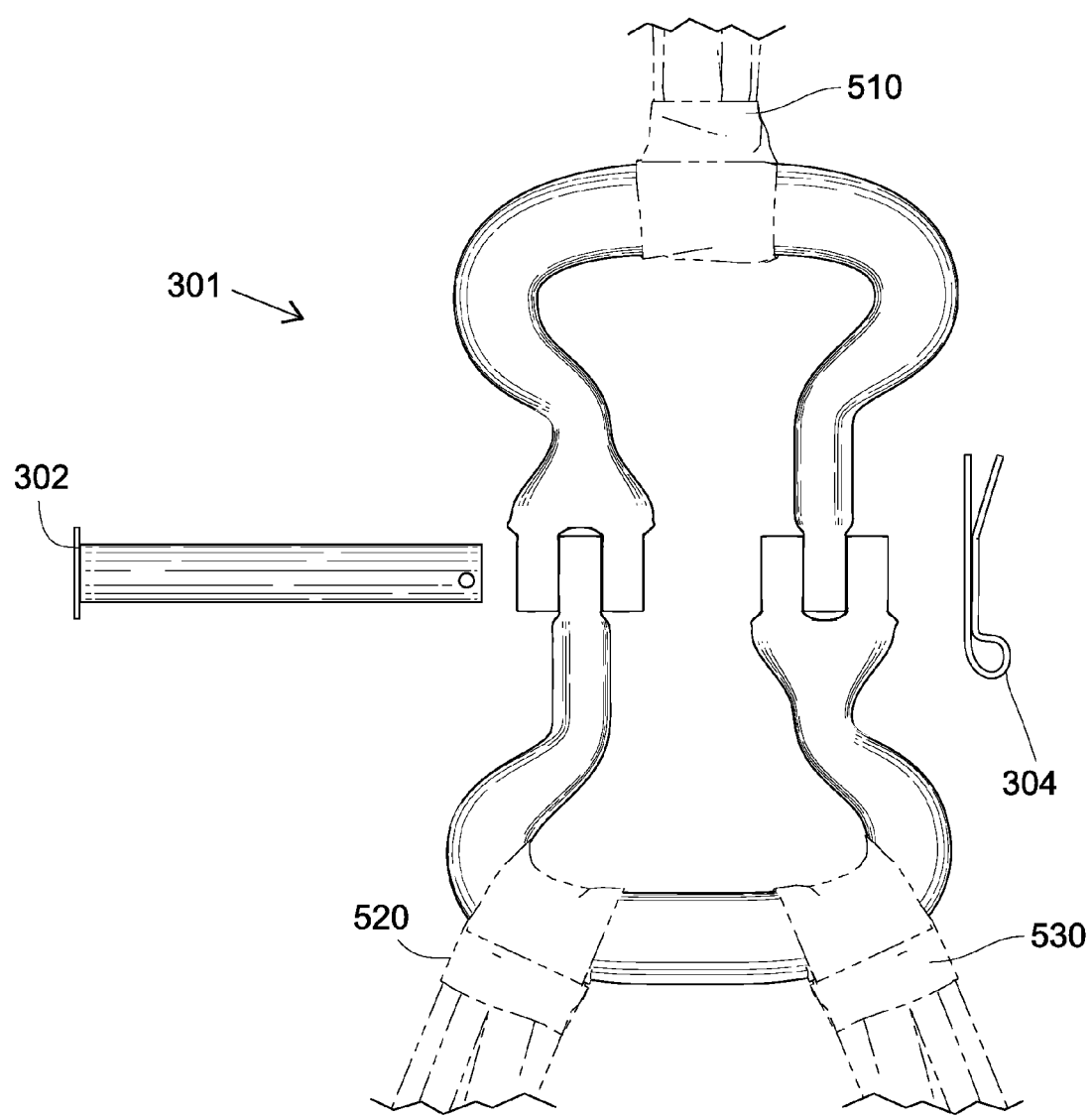
FIG. 5 is a top plan view of the modular mechanical connecting link of FIG. 4 engaged with various tow straps, and disassembled to show the various components.

FIG. 5 is a top exploded view of the mechanical connecting link of FIG. 4 involved in a pulling scenario with tow straps. The tow straps 510, 520, 530 are looped about the shackles on either side of the quick release pin 302, and pulling in a straight line capacity. The tow straps 510, 520, 530 are looped and taut about the flared, smooth and rounded portions of the connector components 101 and 201. In this particular scenario, the mechanical connecting link 301 has reached an equilibrium position with the connector components 101 and 201 articulated about the pin 302 to define a 180-degree angle there between. Of course, with the quick release pin 302 removed as shown in FIG. 5, the connector components 101 and 201 would not stay together, and in the actual pulling scenario, quick release pin 302 would be inserted through the apertures 113, 114, 213, 214 and secured with the snap ring/clevis tang 304 as shown in FIG. 4.

More specifically, FIG. 5 depicts a first tow strap 510 engaged to the modular connector component 101. A second tow strap 520 and a third tow strap 530 are both engaged to the modular connector component 201. The loop of the first tow strap 510 is in alignment with the midpoint 122 of the outer side 115 of the connecter component 101. The loops of the second tow strap 520 and third tow strap 530 are each, respectively, in alignment with one side of the bisected valley 216 along the outer side 215 of the connecter component 201. Despite the pulling scenario and the heavy load, the snap ring/clevis tang 304 is configured for disengagement, which would allow the quick release pin 302 to be retracted from the aligned apertures.

Therefore, as all of the junctions of the shackles on either side of the quick release pin 302 are also smooth and rounded, the tow straps 510, 520, 530 may assume various positions and angles without experiencing significant deviations in bend radii or abrasion. Furthermore, despite the heavy load acting on it, the mechanical connecting link 301 is capable of quick and easy disassembly.

Figure 6:
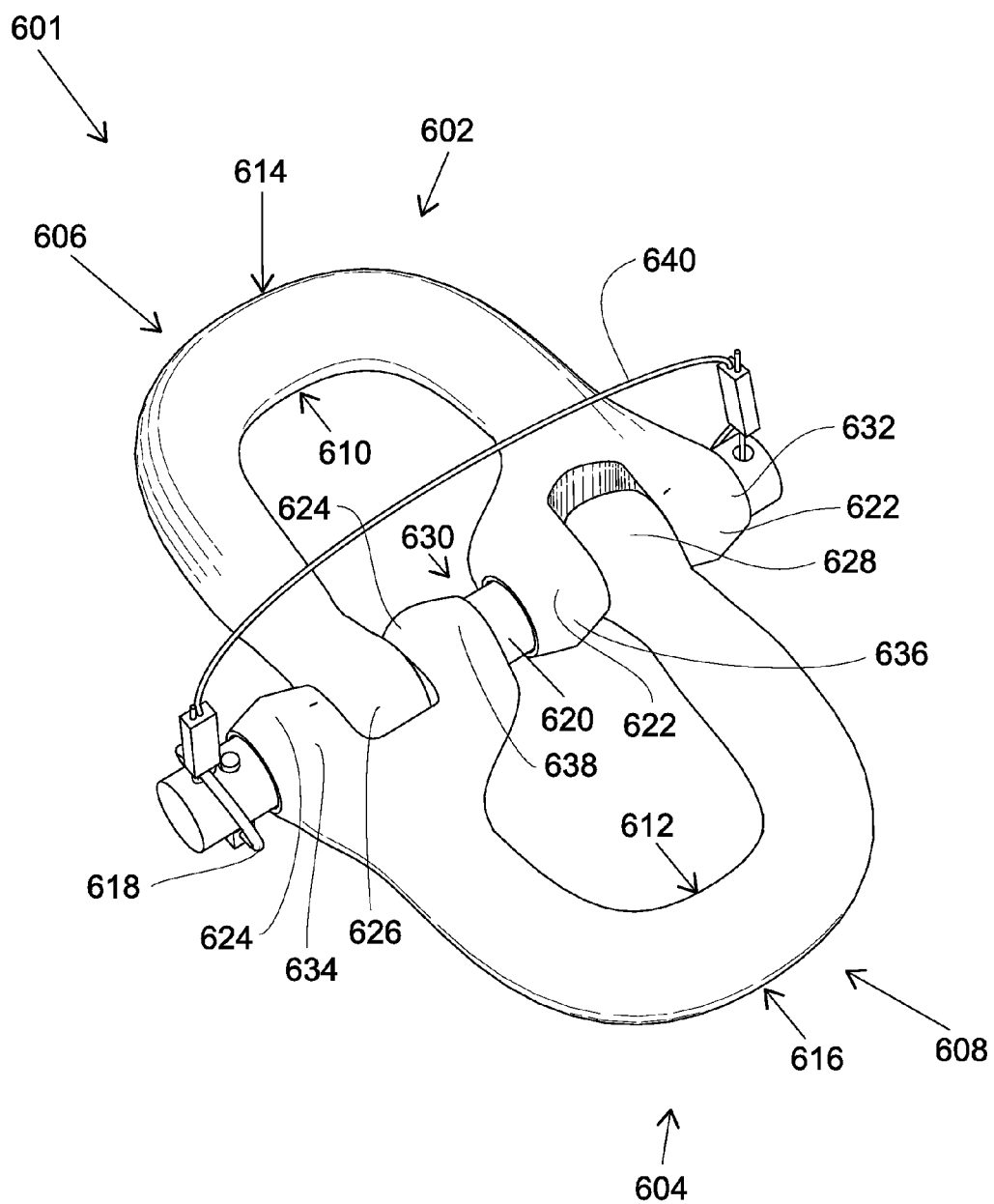
FIG. 6 is a perspective view of an alternative embodiment of the mechanical connecting link.

FIG. 6 is a perspective view of a second or alternative embodiment of a mechanical connecting link 601. The mechanical connecting link 601 is shown fully assembled. The modular connector components 602 and 604 are detachably coupled via a quick release pin 620 and a snap ring/clevis tang 618. The snap ring/clevis tang 618 is detachably coupled to the pin 620 via a retention cable 640. The connector components 602 and 604 are articulated about the pin 620 to define a rotatable 180-degree angle there between. No tow straps are engaged to the connector components 602 and 604.

The modular connector components 602 and 604 are similar to the modular connector components of FIGS. 1-3. Like the connector components of FIGS. 1-3, the inner side 610, 612 of the bent portion 606, 608 preferably is smooth and rounded like the inner side of the horseshoe component of a common shackle connector. Unlike the modular connector components of FIGS. 1-3, the outer side 614, 616 of the bent portion 606, 608 is significantly less flared relative to the margins of the inner side 610, 612. The outer side 614, 616 also lacks any definition of a superficial valley.

Additionally, the first end 622, 624 and the second end 626, 628 of the modular connector components 602 and 604 are situated closer, one in relation to the other. The mechanical connecting link 601, therefore, defines a gap 630 between the first end 622, 624 and the second end 626, 628. The gap 630 exposes the quick release pin 620 as it traverses through the apertures of the connector components 602 and 604.

As is known in the art, sometimes, for machining and/or manufacturing reasons, the gap 630 is unavoidable. In order to prevent entanglement or ensnarement of any looped tow straps in the gap 630, the contour of the outer clevis prong 632, 634 and the inner clevis prong 636, 638 of the connector components 602 and 604 preferably are rounded and smooth. As this rounding and smoothing continues along the surface of the outer clevis prongs 632, 634 and the inner clevis prongs 636, 638 towards the apertures, the mechanical connecting link 601 lacks straight edges, or significant space between articulating components, wherein looped tow straps can become pinched or trapped. This is not limited to this particular embodiment.

Figure 7:
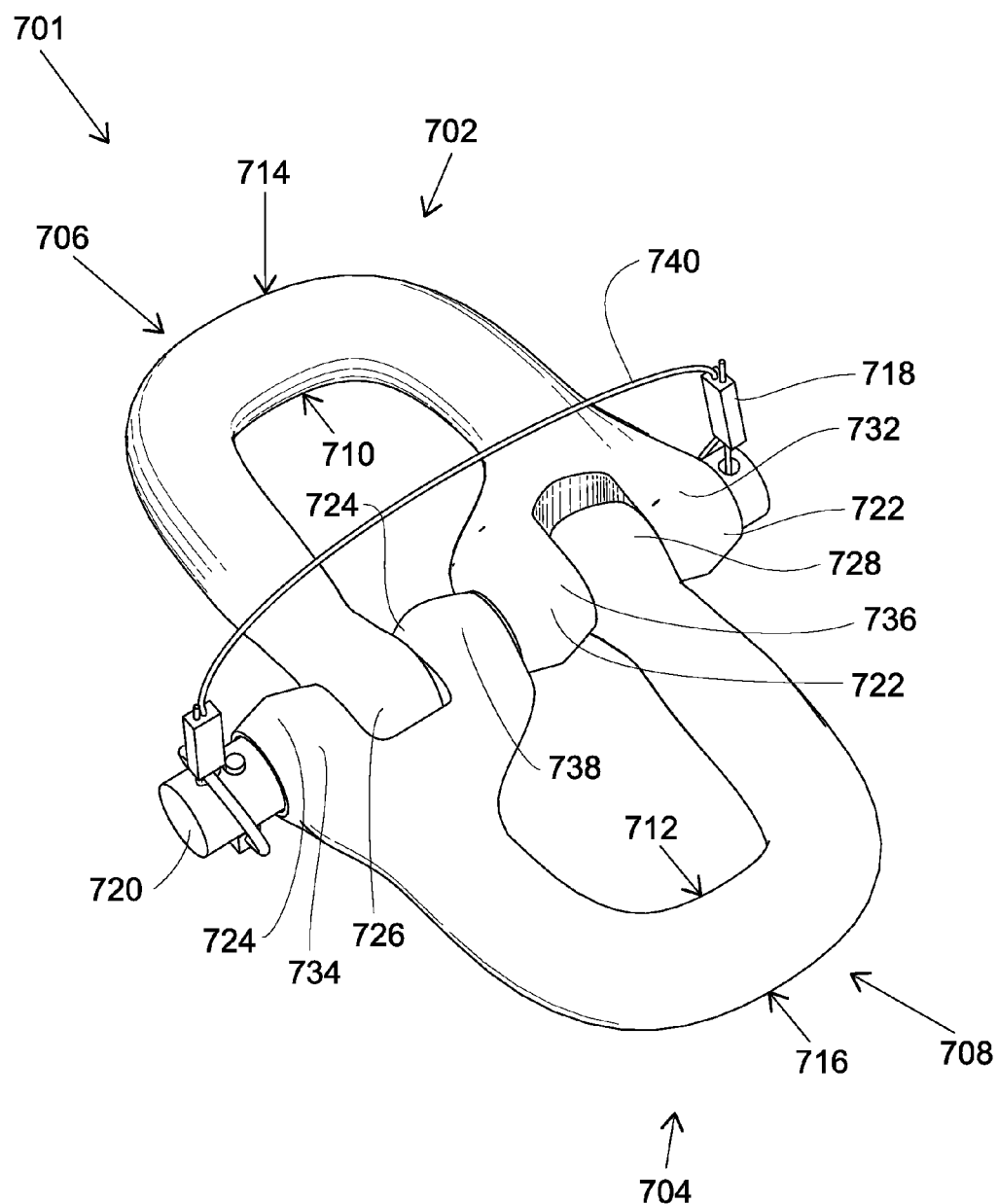
FIG. 7 is a perspective view of an alternative embodiment of the mechanical connecting link.

FIG. 7 is a perspective view of a third or another alternative embodiment of a mechanical connecting link 701. The mechanical connecting link 701 is fully assembled. The modular connector components 702 and 704 are detachably coupled via a quick release pin 720 and a snap ring/clevis tang 718. The snap ring/clevis tang 718 is detachably coupled to the pin 720 via a retention cable 740. The connector components 702 and 704 are articulated about the pin 720 to define a rotatable 180-degree angle there between. No tow straps are engaged to the connector components 702 and 704.

The modular connector components 702 and 704 are similar to the modular connector components of FIG. 6. Like the connector components of FIG. 6, the inner side 710, 712 of the bent portion 706, 708 preferably is smooth and rounded like the inner side of the horseshoe component of a common shackle connector. Unlike the modular connector components of FIG. 6, the outer side 714, 716 of the bent portion 706, 708 is significantly less flared relative to the margins of the inner side 710, 712. In fact, the outer side 714, 716 of the bent portion 706, 708 is smooth and rounded like the outer side of the horseshoe component of a common shackle connector.

Additionally, the first end 722, 724 and the second end 726, 728 of the modular connector components 702 and 704 are situated closer, one in relation to the other, such that one inner clevis prong 736, 738 is nearly touching the other inner clevis prong 738, 736. The mechanical connecting link 701, therefore, lacks the gap 630 of the modular connector components of FIG. 6. One having ordinary skill in the art understands that as the quick release pin 620 is not exposed, and as the contour of the outer clevis prong 732, 734 and the inner clevis prong 736, 738 is rounded and smooth, the mechanical connecting link 701 is also configured to prevent entanglement or ensnarement of any looped tow straps.

A single tow strap or a plurality of tow straps can be attached to each connector component depending on the towing scenario. Suitable tow straps are known in the art.

The connector components and quick release pins are made from high strength materials suitable for use in the desired towing scenario. The connector components can have a size, namely, dimensions, based on the expected or desired towing scenario so as to have a suitable strength.

Figure 8:
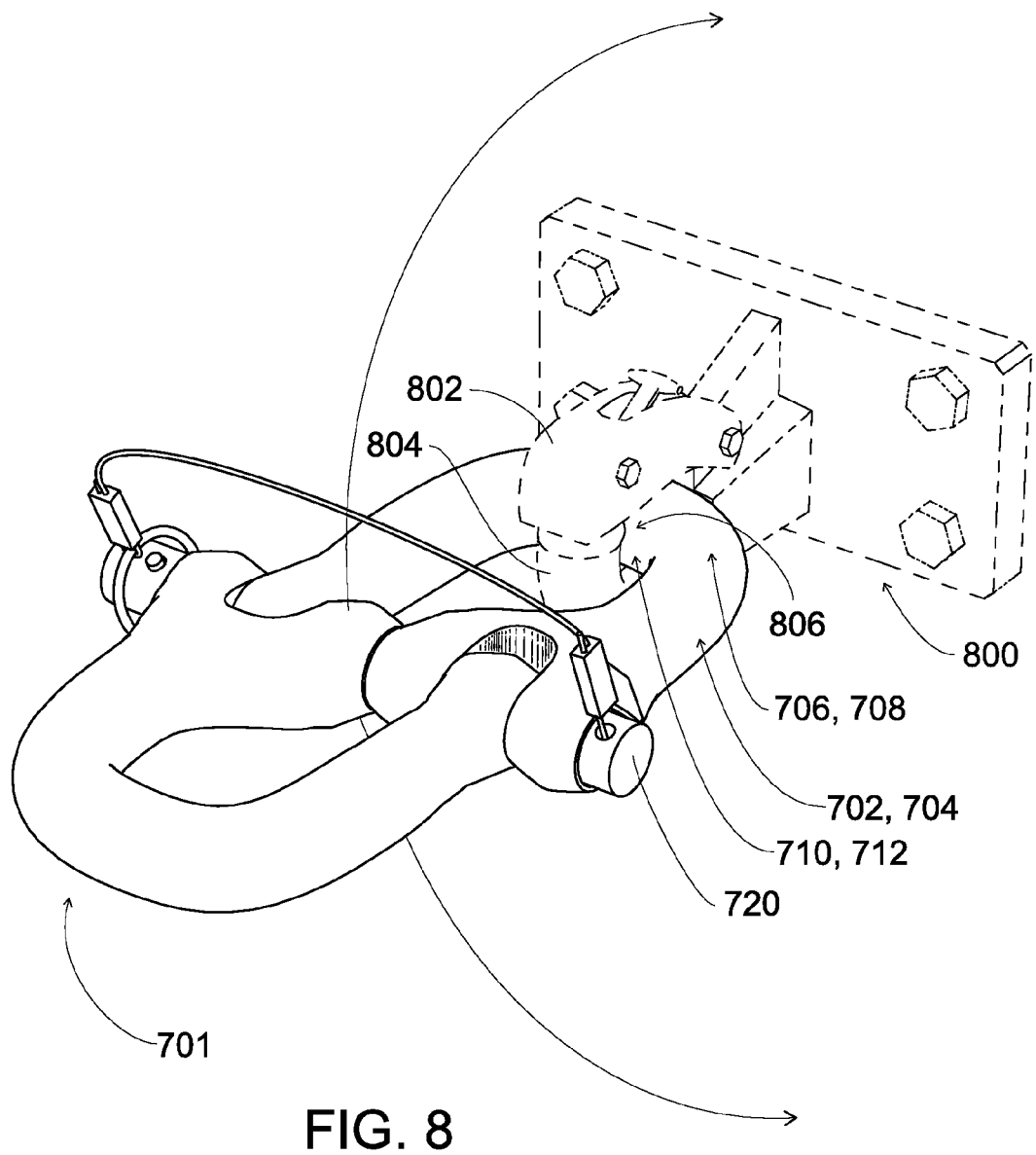
FIG. 8 is a perspective view of the mechanical connecting link of FIG. 7 engaged with a pintle hitch and showing the range of motion of the mechanical connecting link.

FIG. 8 is a perspective view of the mechanical connecting link 701 of FIG. 7 engaged with an exemplary pintle hitch 800 and showing the range of motion of the entire mechanical connecting link 701. The modular connector component 702, 704 of the mechanical connecting link 701 is engaged with a pintle hitch 800. The pintle hitch 800 is closed around the modular connector component 702, 704 via an articulating component 802 such that the modular connector component 702, 704 is firmly retained between the articulating component 802 and a pintle hook 804. The pintle hitch 800 defines a space 806 between the closed articulating component 802 and the pintle hook 804 wherein the modular connector component 702, 704 is rotatably retained. In this particular embodiment, the pintle hitch 800 is a tow pintle that satisfies the North Atlantic Treaty Organization (NATO) Standardization Agreement (STANAG); however, other pintle hitch types and examples are envisioned.

More specifically, FIG. 8 depicts the bent portion 706, 708 of the modular connector component 702, 704 positioned and rotatably retained with the space 806 of the pintle hitch 800. The inner side 710, 712 of the bent portion 706, 708 complements and fits along the curved concave contour defined by the pintle hook 804. As such, the modular connector component 702, 704 is configured to rotate within the space 806 with limited friction or interference from any surface features along the curved concave contour defined by the pintle hook 804. The mechanical connecting link 701 is, therefore, configured to have a range of motion 808 about the closed pintle hitch 800, and to function as a pintle extension.

Of course, it is envisioned that the mechanical connecting links 301 and 601 can be similarly configured and structured, and that the corresponding embodiments of the pintle hitch 800 would cooperate with them as well. This is true regardless of any flaring that might exist along the mechanical connecting links 301, 601, 701 because the inner side 117, 217, 710, 712, not the outer side 115, 215, 714, 716, of the bent portion 102, 202, 706, 708 is what comes into primary contact, and is what primarily facilitates the rotatably engagement of the mechanical connecting link 301, 601, 701 within the specific embodiment of the pintle hitch 800.

Although the particular embodiments shown and described above will prove to be useful in many applications in the towing art to which the present invention pertains, further modifications of the present invention will occur to persons skilled in the art. All such modifications are deemed to be within the scope and spirit of the present invention as defined by the appended claims.

What is claimed is:

1. A mechanical connecting link, comprising:
   a) at least two modular connector components each, respectively, comprising a bent portion between a clevis termination and male clevis prong, the clevis termination defining a space between an outer clevis prong and an inner clevis prong, the space configured to receive the male clevis prong of the other respective modular connector component, the outer clevis prong defining a first aperture, the inner clevis prong defining a second aperture and the male clevis prong defining a third aperture; and
   b) a quick release pin traversing the first aperture, the second aperture and the third aperture and, therefore, detachably and pivotally coupling the at least two modular connector components such that each of the at least two modular connector components forms an articulating shackle about the quick release pin;
   wherein each articulating shackle is configured to engage with at least one looped tow strap along the bent portion;
   wherein contours of the outer clevis prong and the inner clevis prong of each clevis termination surrounding each, respective, first aperture and second aperture are rounded and smooth to prevent entanglement of the at least one looped tow strap;
   wherein, when the at least one looped tow strap are engaged, the mechanical connecting link can optionally disassemble via removal of the quick release pin,
   wherein a contour of the bent portion defines an inner side and an outer side that extend from the first end to the second end, the outer side flared when compared to the margins of the inner side,
   wherein junctions between the bent portion, the first end, and the second end of the at least two modular connector components are each, respectively, smooth and rounded, and junctions between the inner side and the outer side are each, respectively, configured to minimize surface friction against a looped stow strap rubbing thereon, and
   wherein the junctions between the inner side and the outer side each, respectively, further comprise a dimpled surface.

2. The mechanical connecting link of claim 1, wherein the outer side of the bent portion comprises a first superficial ridge and a second superficial ridge running lengthwise and defining a valley there between, the first superficial ridge and the second superficial ridge situated on the junction of the inner side and the outer side of the bent portion.

3. The mechanical connecting link of claim 2, wherein the valley is bisected by a midpoint, and, on either side of the midpoint, tapers toward the midpoint such that the midpoint is elevated to the same height as the first superficial ridge and the second superficial ridge.

4. A mechanical connecting link, comprising:
   a) at least two modular connector components each, respectively, comprising a bent portion between a clevis termination and male clevis prong, the clevis termination defining a space between an outer clevis prong and an inner clevis prong, the space configured to receive the male clevis prong of the other respective modular connector component, the outer clevis prong defining a first aperture, the inner clevis prong defining a second aperture and the male clevis prong defining a third aperture;
   b) a quick release pin traversing the first aperture, the second aperture and the third aperture and, therefore, detachably and pivotally coupling the at least two modular connector components such that each of the at least two modular connector components forms an articulating shackle about the quick release pin; and
   c) a snap ring for preventing the quick release pin from retracting out of the mechanical connecting link, the snap ring detachably coupled to the pin via a retention cable, wherein each articulating shackle is configured to engage with at least one looped tow strap along the bent portion;

wherein contours of the outer clevis prong and the inner clevis prong of each clevis termination surrounding each, respective, first aperture and second aperture are rounded and smooth to prevent entanglement of the at least one looped tow strap; and wherein, when the at least one looped tow strap are engaged, the mechanical connecting link can optionally disassemble via removal of the quick release pin.

5. The mechanical connecting link of claim 4, wherein the bent portion has a contour that defines an inner side and an outer side that extend from the first end to the second end, the outer side flared when compared to the margins of the inner side.

6. The mechanical connecting link of claim 5, wherein the outer side of the bent portion comprises a first superficial ridge and a second superficial ridge running lengthwise and defining a valley there between, the first superficial ridge and the second superficial ridge situated on the junction of the inner side and the outer side of the bent portion.

7. The mechanical connecting link of claim 4, wherein the valley is bisected by a midpoint, and, on either side of the midpoint, tapers toward the midpoint such that the midpoint is elevated to the same height as the first superficial ridge and the second superficial ridge.

8. The mechanical connecting link of claim 4, wherein junctions between the bent portion, the first end, and the second end of each of the at least two modular connector components are each, respectively, smooth and rounded, and the junctions between the inner side and the outer side are each, respectively, smooth and rounded.

9. The mechanical connecting link of claim 4, wherein junctions between the bent portion, the first end, and the second end of the at least two modular connector components are each, respectively, smooth and rounded, and the junctions between the inner side and the outer side are each, respectively, configured to minimize surface friction against a looped stow strap rubbing thereon.

10. The mechanical connecting link of claim 9, wherein the junctions between the inner side and the outer side each, respectively, comprise a dimpled surface.

11. A mechanical connecting link, comprising:
a) a first modular connector component and a second modular connector component each, respectively, comprising a bent portion between a clevis termination and male clevis prong, the clevis termination defining a space between an outer clevis prong and an inner clevis prong, the space configured to receive the male clevis prong of the other respective modular connector component;

b) a quick release pin traversing the outer clevis prong, the inner clevis prong and the male clevis prong of each modular connector component such that the first modular connector component forms a first articulating shackle about the quick release pin, and the second modular connector component forms a second articulating shackle about the quick release pin, the inner clevis prong of the first articulating shackle adjacent the inner clevis prong of the second articulating shackle; and c) a snap ring for preventing the quick release pin from retracting out of the mechanical connecting link, the snap ring detachably coupled to the pin via a retention cable wherein each articulating shackle is configured to engage with at least one looped tow strap along the bent portion; and wherein, when the at least one looped tow strap are engaged, the mechanical connecting link can optionally disassemble via removal of the quick release pin.

12. The mechanical connecting link of claim 11, wherein the bent portion has a contour that defines an inner side and an outer side that extend from the first end to the second end, the outer side flared when compared to the margins of the inner side.

13. The mechanical connecting link of claim 11, wherein the first modular connector component and the second modular connector component envelope the quick release pin in forming the first articulating shackle and the second articulating shackle.

14. The mechanical connecting link of claim 11, wherein the outer clevis prong and the inner clevis prong of each clevis termination each has a contour that is rounded and smooth to prevent entanglement of a looped tow strap.

15. The mechanical connecting link of claim 11, wherein junctions between the bent portion, the first end, and the second end of the modular connector component are each, respectively, smooth and rounded.

* * * * *